United States Patent [19]

Neusy

[11] Patent Number: 4,894,081
[45] Date of Patent: Jan. 16, 1990

[54] SPHERULIZING FURNACE

[75] Inventor: Hubert Neusy, Montignies-sur-Sambre, Belgium

[73] Assignee: Glaverbel, Brussels, Belgium

[21] Appl. No.: 216,646

[22] Filed: Jul. 8, 1988

[30] Foreign Application Priority Data

Jul. 9, 1987 [GB] United Kingdom ............... 8716188

[51] Int. Cl.$^4$ ............................................ C03B 19/10
[52] U.S. Cl. ...................................... 65/142; 65/21.3; 65/25.1; 65/26; 65/144; 65/374.15; 425/6
[58] Field of Search .................... 65/21.3, 21.4, 22, 27, 65/142, 144, 25.1, 26, 374.15; 425/6

[56] References Cited

U.S. PATENT DOCUMENTS

| | | | |
|---|---|---|---|
| 2,044,680 | 6/1936 | Gilbert | 65/21.3 |
| 2,947,115 | 8/1960 | Wood | 65/142 |
| 4,046,548 | 9/1977 | Wood et al. | 65/142 |
| 4,235,618 | 11/1980 | Henry et al. | 65/21.4 |
| 4,313,745 | 2/1982 | Lovelace et al. | 65/21.4 |
| 4,475,936 | 10/1984 | Aston et al. | 65/142 |
| 4,487,620 | 12/1984 | Neusy | 65/21.3 |

FOREIGN PATENT DOCUMENTS 2176774 6/1985 United Kingdom .
2177082 6/1986 United Kingdom .
2177083 6/1986 United Kingdom .

Primary Examiner—Robert L. Lindsay
Attorney, Agent, or Firm—Spencer & Frank

[57] ABSTRACT

A spherulizing furnace for manufacturing vitreous beads, including a chamber; means for heating the chamber; feed means for delivering a particulate feedstock to one end of the chamber; and means for collecting vitreous beads from another end of the chamber, wherein the chamber includes a pair of opposed walls which are spaced apart by a distance less than their breadth and which are angled to the horizontal so that the chamber has an upper end and a lower end, the feed means is arranged to deliver feedstock to the upper end of the chamber so that the feedstock can pass through the chamber under gravity, and the means for heating the chamber is arranged to heat at least one wall of the pair of opposed walls so that feedstock passing between the pair of opposed walls is heated by radiant heat.

15 Claims, 4 Drawing Sheets

SPHERULIZING FURNACE

BACKGROUND OF THE INVENTION

1. Field of the Invention

This invention relates to a spherulizing furnace for manufacturing vitreous beads comprising a chamber, means for heating the chamber and feed means for delivering a particulate feedstock to one end of the chamber and means for collecting vitreous beads from the other end of the chamber. The invention includes a process of manufacturing vitreous beads in which particulate feedstock is delivered to a heated chamber and passed along it so that the feedstock is heated and converted to vitreous beads whereafter the beads are collected. The invention extends to vitreous beads made by such a process.

2. Description of the Related Art

In classical spherulizing furnaces, particulate feedstock is fed to the base of a vertical cylindrical combustion chamber where it is surrounded by a burner flame and entrained upwardly. The feedstock particles become spherulized by contact with the flame, and the resulting vitreous beads are carried out of the top of the combustion chamber in a stream of hot gas, and thence to cyclones for grading and collection. Such an arrangement requires very high flow rates of the carrier gas, and since this gas must necessarily be heated by the flame in the combustion chamber, it entails considerable wastage of heat energy, thus adding to the cost of producing the beads.

SUMMARY OF THE INVENTION

It is an object of the present invention to provide a spherulizing furnace which can be run in a more economical manner.

According to the present invention, there is provided a spherulizing furnace for manufacturing vitreous beads comprising a chamber, means for heating the chamber and feed means for delivering a particulate feedstock to one end of the chamber and means for collecting vitreous beads from the other end of the chamber, characterised in that said chamber comprises a pair of opposed walls which are spaced apart by a distance less than their breadth and which are angled to the horizontal so that the chamber has upper and lower ends, the feed means is arranged to deliver feedstock to the upper end of the chamber so that the feedstock can pass through the chamber under gravity, and the heating means is arranged to heat at least one said wall so that feedstock passing between the walls is heated by radiant heat.

Such a furnace can be run more economically than classical spherulizing furnaces as described above.

By delivering the feedstock to the upper end of the heating chamber, the feedstock can be allowed to travel down through the chamber under gravity and the need for any substantial carrier gas stream which must be heated is avoided. Downward travel of the particles is also facilitated by the use of radiant heaters as opposed to flame heating. Such flame would require to be fed with fuel gas and comburent, and the resulting combustion products, because of their heat and consequent low density, would tend to form a strong undraught in the chamber. An appropriate spacing of the walls of the chamber allows a good heating of even those feedstock particles which are furthest from the walls, and increasing the breadth of the walls increases the size of the chamber and thus allows a greater throughput and product yield.

The actual wall spacing to be used is not critical, though it is of some importance for achieving optimum results. Such wall spacing may also depend on the configuration of the heating chamber, for example on whether the walls are parallel or not. We have found that in embodiments in which the chamber is formed by parallel wall sections, a spacing of 15 cm to 30 cm, for example 20 cm, over at least part of the chamber length gives good results.

Likewise, the breadth of the walls is not critical. Clearly, the greater the wall breadth, the greater will be the capacity of the furnace, but also, a greater wall breadth will give rise to increasing problems in the uniform feeding of the feedstock which is important for uniform treatment and the achievement of a uniform high quality product. We have found that a wall breadth of about 1 meter is a good compromise.

In preferred embodiments of the invention, said walls are faced with material which reduces the tendency of hot vitreous beads to adhere to them, preferably with carbon (for example graphite) or boron nitride. This helps to maintain the efficiency of the furnace during its operation, and it also of course increases the yield by the amount of particles which might otherwise adhere to the chamber walls.

In some preferred embodiments of the invention, means is provided for generating a gas stream which flows as a boundary layer along at least one wall. This is another very effective way of inhibiting the particles from sticking to the chamber walls.

In such embodiments, it is advantageous that at least one wall of the chamber is porous and means is provided for forcing gas to flow through that porous wall to form a said boundary layer. This is a very simple and effective apparatus for forming such a boundary layer, and it is especially preferred where the chamber is so inclined to the horizontal that the feedstock tends to roll down one wall of the chamber, because it can easily be arranged to assist passage of the particles through the chamber.

Advantageously, means is provided for maintaining a non-oxidising atmosphere within the chamber. This is of special benefit when wall facings of carbon are used, so as to prevent oxidation of those carbon facings. It is also of benefit in increasing the working life of any electrical resistance heating elements which may be incorporated in the chamber. Gas introduced to form a said boundary layer may for example be nitrogen. Alternatively, hydrogen may be introduced in order to form a reducing atmosphere: in such a case of course care must be taken that no explosive mixture is formed.

We have referred to the use of a chamber which is so inclined to the horizontal that the feedstock tends to roll down one wall. The exact angle of inclination is not critical. All that is necessary is that it should be great enough for gravity feed of the particles through the furnace. It is however preferred that the walls of the chamber are so angled to the horizontal as to define a substantially vertical path down the chamber. This reduces the tendency of the particulate material to impinge against the walls. If it does not come into contact with the walls, the particulate material cannot stick to them.

Advantageously, the chamber walls are more widely spaced at the lower end of the chamber than at the upper end. This again reduces the tendency of the particulate material to impinge against the walls of the chamber despite the tendency of the stream of particles to spread out as it descends.

Preferably, the feed means comprises a feedstock reservoir having a porous sole and means for feeding compressed gas through such sole to fluidize feedstock in the reservoir, and most advantageously, said reservoir is arranged above the chamber for delivering feedstock by fluidized overflow. We have found that the use of a fluidized bed gives a good separation of the feedstock prior to its introduction into the heating chamber, and this promotes a good and uniform separation of the feedstock as it enters that chamber. This is important for uniform treatment of the particles falling down the chamber. This can be and preferably is achieved using a very simple apparatus in which the fluidized bed is located above the chamber for delivering feedstock by fluidized overflow. The fluidized feedstock can simply be allowed to fall over a lip of the reservoir and drop into the heating chamber of the spherulizing furnace. This allows a highly uniform rate of feed across the breadth of the chamber. A constant height of the fluidized bed may easily be maintained by feeding fresh feedstock to the reservoir at a rate in excess of that being spherulized, the excess feedstock being allowed to flow from the reservoir through a second overflow outlet for recycling.

Advantageously, a conduit for feeding said compressed gas passes a heat exchanger for preheating such gas. In this way, waste heat from the spherulizing furnace may be used for preheating the feedstock before spherulizing, thus leading to a further improvement in heat economy.

The chamber may be constituted by refractory walls which are heated externally by burners, but a better control of the heating is afforded when, as is preferred, said heating means comprises at least one electrical heater. Such an electrical heater may be a resistance heater, or, if appropriate, it may be an induction heater.

In some preferred embodiments of the invention, said heating means is arranged differentially to heat at least two zones of said chamber. Such may easily be achieved using electrical heating means. Differential heating is of particular benefit in the manufacture of cellular and/or vitroceramic beads, that is, beads of partially devitrified glass. By way of example, we have found that for some feedstock compositions, it is desirable to allow the particles to expand while subjected to a temperature in the range 400° C. to 500° C., to heat them to say 800° C. to 900° C. for spherulization, and to heat them to about 1200° C. for partial devitrification, all in order to manufacture cellular vitroceramic beads.

Apparatus according to the invention is suitable for the manufacture of vitreous beads using feedstocks of various compositions. For the manufacture of solid beads, it is appropriate to use crushed glass cullet of the desired composition. For the manufacture of cellular beads, a pelletized feedstock containing glass formers and cellulating agent of a composition known per se may be used. For the manufacture of a mixture of solid and cellular beads it is appropriate to use a feedstock of particles of incompletely vitrified or unrefined glass for example as described in British Patent Specification GB No. 2 176 774 A. Alternatively, particles of a glass-former composition containing chemically bound water may be used as described in British Patent Specifications GB No. 2 177 082 A and GB No. 2 177 083 A.

Apparatus according to the invention is also suitable for the manufacture of vitreous beads of various sizes. For example the apparatus may be used in the manufacture of beads having sizes of 5 $\mu$m to 800 $\mu$m or even larger.

Especially in the case of larger beads, it is desirable that they should be cooled before they are allowed to settle in contact with one another to a sufficient extent that they do not tend to agglomerate. To achieve this end, it is preferred that said means for collecting vitreous beads from the chamber comprises a reservoir having a porous sole and means for feeding compressed gas through such sole to fluidize beads in the reservoir. The use of a fluidizing gas at ambient temperature is sufficient to keep the beads in movement so that they do not agglomerate while cooling. The fluidizing gas, which will have been heated by exchange with the cooling beads may be drawn off and recycled as fluidizing gas for a feedstock reservoir if desired. The rate of gas injection into the fluidized collection bed may be controlled so that beads below a certain size and/or density are ejected from the fluidized bed for collection and further sorting in a series of cyclones as is well known per se.

In operation of the furnace, a natural updraught will be created through the chamber due to its heating. In some circumstances this may be sufficient to hinder the egress of the beads from the lower end of the chamber. In order to overcome this phenomenon, it is preferred that said means for collecting vitreous beads from the chamber includes means for aspirating gas away from the lower end of the chamber. It is not necessary that this aspiration should be very strong. We have found that an aspiration rate sufficient to maintain an underpressure of about 1 mm water (10 Pa) at the exit to the chamber is usually enough.

The invention includes a process of manufacturing vitreous beads, and it provides a process of manufacturing vitreous beads in which particulate feedstock is delivered to a heated chamber and passed along it so that the feedstock is heated and converted to vitreous beads whereafter the beads are collected, characterised in that the chamber is shaped to provide a flow path for the particles which is of elongate cross section and is arranged so that the particles pass downwardly through it under gravity, and in that the particles passing through the chamber are heated by radiant heat from the chamber walls.

Such a process enables the economical production of vitreous beads.

By delivering the feedstock to the heating chamber so that it travels down through the chamber under gravity, the need to supply any substantial carrier gas stream and to heat it is avoided. Downward travel of the particles is also facilitated by the use of radiant heaters as opposed to flame heating. Such flame would require to be fed with fuel gas and comburent, and the resulting combustion products, because of their heat and consequent low density, would tend to form a strong updraught in the chamber. An appropriate spacing of the walls of the chamber allows a good heating of even those feedstock particles which are furthest from the walls, and increasing the breadth of the walls increases the size of the chamber and thus allows a greater throughput and product yield.

Preferably, a gas stream is caused to flow as a boundary layer along at least one wall of the chamber. This is a very effective way of inhibiting the particles from sticking to the chamber walls. It helps to maintain the efficiency of the furnace during its operation, and it also of course increases the yield by the amount of particles which might otherwise adhere to the chamber walls.

Advantageously, a said boundary layer is formed by causing gas to flow through a porous wall of said chamber. This is a very simple and effective method of forming such a boundary layer, and it is especially preferred where the chamber is so inclined to the horizontal that the feedstock tends to roll down one wall of the chamber, because it can easily be arranged to assist passage of the particles through the chamber.

In some preferred embodiments of the process of the invention, a non-oxidising atmosphere is maintained within the chamber. The adoption of this feature has particular advantages in inhibiting particles, especially small particles, from sticking to the chamber walls. It is also of advantage in reducing the likelihood of corrosion of any electrical heating element exposed within the chamber, and where the interior of the chamber is faced with an oxidisable material such as carbon.

Nitrogen may for example be introduced to form a said boundary layer. Alternatively, or in addition, hydrogen may be introduced in order to form a reducing atmosphere: in such a case of course care must be taken that no explosive mixture is formed.

Preferably, the particles are allowed to fall freely through the chamber. As compared with the use of a chamber which is so inclined to the horizontal that the feedstock tends to roll down one wall, this reduces the tendency of the particulate material to impinge against the walls. If it does not come into contact with the walls, the particulate material cannot stick to them.

Advantageously, the chamber walls are more widely spaced at the lower end of the chamber than at the upper end. This again reduces the tendency of the particulate material to impinge against the walls of the chamber despite the tendency of the stream of particles to spread out as it descends.

In especially preferred embodiments of the invention, the feedstock is fed to the chamber from a fluidized bed. We have found that the use of a fluidized bed gives a good separation of the feedstock prior to its introduction into the heating chamber, and this promotes a good and uniform separation of the feedstock as it enters that chamber. This is important for uniform treatment of the particles falling down the chamber. This can be and preferably is achieved in a very simple manner in which the feedstock is fed to the chamber by fluidized overflow from the fluidized bed. The fluidized feedstock can simply be allowed to fall over a lip of a reservoir and drop into the heating chamber of the spherulizing furnace. This allows a highly uniform rate of feed across the breadth of the chamber. A constant height of the fluidized bed may easily be maintained by feeding fresh feedstock to the reservoir at a rate in excess of that being spherulized, the excess feedstock being allowed to flow from the reservoir through a second overflow outlet for recycling.

Advantageously, fluidizing gas is preheated. In this way, there is a reduced requirement for heating in the chamber itself. The fluidized gas may for example be preheated by passing it through a heat exchanger to utilize waste heat from the spherulizing furnace, thus leading to a further improvement in heat economy.

The chamber may be heated externally by burners, but a better control of the heating is afforded when, as is preferred, the chamber is heated electrically.

In some preferred embodiments of the invention, there are different zones along said chamber which are heated differently. Such may easily be achieved using electrical heating means. Differential heating is of particular benefit in the manufacture of cellular and/or vitroceramic beads, that is, beads of partially devitrified glass. By way of example, we have found that for some feedstock compositions, it is desirable to allow the particles to expand while subjected to a temperature in the range 400° C. to 500° C., to heat them to say 800° C. to 900° C. for spherulization, and to heat them to about 1200° C. for partial devitrification, all in order to manufacture cellular vitroceramic beads.

It will be appreciated that the first or last of the three heating zones may be dispensed with if it is desired to manufacture solid vitroceramic, or hollow glass beads respectively. It is preferred that the temperatures in the different zones along said chamber progressively increase in the direction of particle flow.

A process according to the invention is suitable for the manufacture of vitreous beads using feedstocks of various compositions. For the manufacture of solid beads, it is appropriate to use crushed glass cullet of the desired composition. For the manufacture of cellular beads, a pelletized feedstock containing glass formers and cellulating agent of a composition known per se may be used. For the manufacture of a mixture of solid and cellular beads it is appropriate to use a feedstock of particles of incompletely vitrified or unrefined glass for example as described in British Patent Specification GB No. 2 176 774 A. Alternatively, particles of a glass-former composition containing chemically bound water may be used as described in British Patent Specifications GB No. 2 177 082 A and GB No. 2 177 083 A.

A process according to the invention is also suitable for the manufacture of vitreous beads of various sizes. For example the process may be used in the manufacture of solid beads having sizes in the range 5 $\mu$m to 800 $\mu$m or even larger.

Especially in the case of larger beads, it is desirable that they should be cooled before they are allowed to settle in contact with one another to a sufficient extent that they do not tend to agglomerate. To achieve this end, it is preferred that the resulting beads should be collected in a fluidized bed. The use of a fluidizing gas at ambient temperature is sufficient to keep the beads in movement so that they do not agglomerate while cooling. The fluidizing gas, which will have been heated by exchange with the cooling beads may be drawn off and recycled as fluidizing gas for a feedstock reservoir if desired. The rate of gas injection into the fluidized collection bed may be controlled so that beads below a certain size and/or density are ejected from the fluidized bed for collection and further sorting in a series of cyclones as is well known per se.

In operation of the furnace, a natural updraught will be created through the chamber due to its heating. In some circumstances this may be sufficient to hinder the egress of the beads from the lower end of the chamber. In order to overcome this phenomenon, it is preferred that gas is aspirated away from the lower end of the chamber. It is not necessary that this aspiration should be very strong. We have found that an aspiration rate sufficient to maintain an under-pressure of about 1 mm water (10 Pa) at the exit to the chamber is usually enough.

The invention includes vitreous beads made by a process as herein defined.

BRIEF DESCRIPTION OF THE DRAWING

Preferred embodiments of the invention will now be described with reference to the accompanying diagrammatic drawing, in which.

DESCRIPTION OF THE PREFERRED EMBODIMENTS

Figure 1:
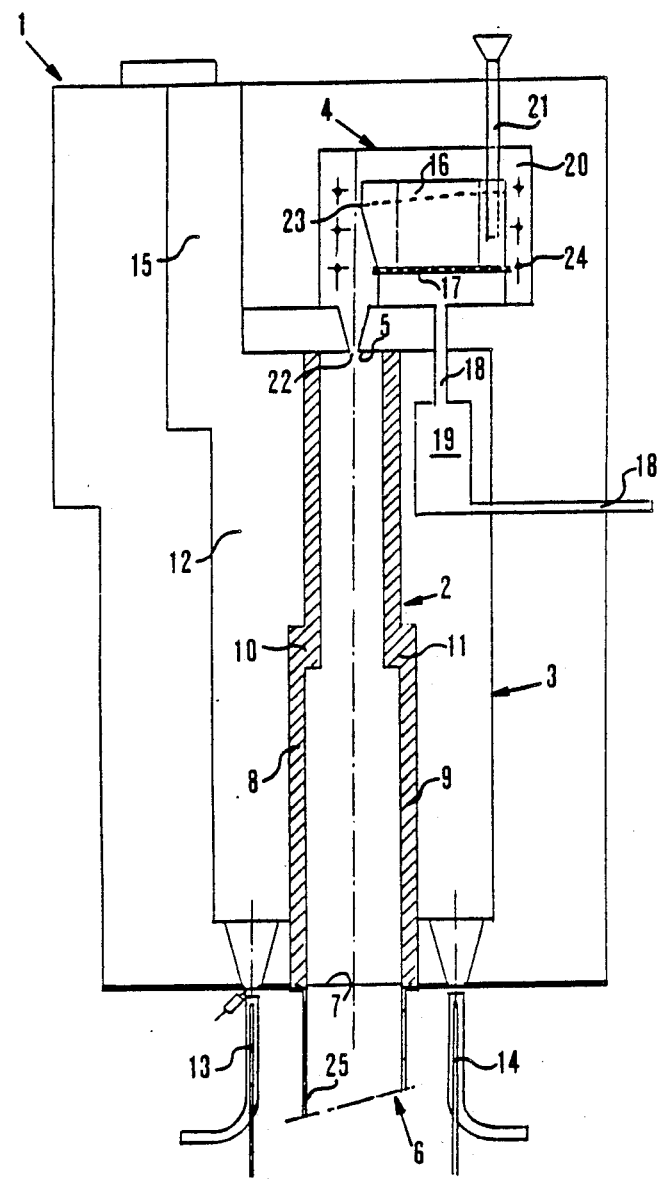
FIGS. 1 to 4 are each a cross sectional view of an embodiment of spherulizing furnace in accordance with the invention.

In the drawings, a spherulizing furnace 1 for manufacturing vitreous beads comprises a chamber 2, means 3 for heating the chamber and feed means 4 for delivering a particulate feedstock to one end 5 of the chamber and means 6 for collecting vitreous beads form the other end 7 of the chamber. The chamber 2 comprises a pair of opposed walls 8, 9 which are spaced apart by a distance less than their breadth and which are angled to the horizontal so that the chamber 2 has upper 5 and lower 7 ends. The feed means 4 is arranged to deliver feedstock to the upper end 5 of the chamber 2 so that the feedstock can pass through the chamber 2 under gravity, and the heating means 3 is arranged to heat at least one wall 8, 9 so that feedstock passing between the walls is heated by radiant heat.

In FIG. 1, the chamber 2 runs vertically. The walls 8, 9 are formed of refractory blocks, and they have shoulders 10, 11 about half way up their height so that they are more widely spaced in the lower half of the chamber 2. This allows the particles to spread out as they fall while keeping the risk of contact between the particles and the chamber walls at a low level. In a specific example, the walls 8, 9 are spaced apart by 20 cm in their upper parts and by 30 cm in their lower parts, and they are 1 meter in breadth. The optimum height of the chamber 2 is governed by the desired dwell time of the particles in the furnace, and this in turn depends on the size of the beads to be produced. For producing solid glass beads from crushed cullet, suitable heights are: for a mean bead diameter of 200 μm, 1.5 to 2 meters; and for a mean bead diameter of 800 μm, 5 meters. The walls 8,9 may be faced with a material such as carbon or boron nitride which reduces any tendency the particles may have to stick to them.

The heating means 3 comprises a jacket 12 which surrounds the chamber and which is heated by burners 13, 14 which may be fed with air and natural gas, for heating the walls 8, 9 of the chamber so that those walls can in turn radiate heat to heat and spherulize feedstock falling between them. Burner combustion products are led off through a chimney 15.

The feed means 4 comprises a feedstock reservoir 16 having a porous sole 17 and a conduit 18 for feeding compressed gas through such sole to fluidize feedstock in the reservoir. The conduit 18 passes a heat exchanger 19 to preheat the fluidizing gas and thus the feedstock particles in the reservoir 16. The heat exchanger 19 is located within the heated jacket 12. The reservoir 16 is located in a compartment 20 which is closed except for the fluidizing gas inlet, a feedstock inlet 21 and a slot 22 located over the centre of the heating chamber 2. That compartment is thus pressurized by the fluidizing gas, so that particle feed through the slot 22 is not impeded by any natural updraught through the chamber 2. The reservoir 16 has a lip 23 located aligned above the slot 22, so that fluidized feedstock can flow over that lip and fall down through the slot 22 into the heating chamber 2 for spherulization. Auxiliary electric heating means 24 may be provided in the compartment 20 for preheating the feedstock if desired.

For a fluidized bed of 500 kg capacity, it is suitable to use as reservoir sole 17 a stainless steel plate 2 square meters in area having a porosity of 35 μm.

The processed beads are collected in any suitable manner via a collection pipe 25.

Using a classical spherulizing furnace in which particulate feedstock is fed to the base of a vertical cylindrical combustion chamber where it is surrounded by a burner flame and entrained upwardly, we have been able to manufacture spherulized solid vitreous beads using crushed glass cullet as starting material with specific energy consumptions as shown in the following Table 1.

TABLE 1

| Energy consumption | Bead granulometry |
| --- | --- |
| 3 kWH/kg beads | less than 44 μm |
| 4.5 kWH/kg beads | less than 250 μm |
| 6 kWH/kg beads | 250 μm to 500 μm |
| 12 kWH/kg beads | 400 μm to 800 μm |

By making use of a furnace constructed in accordance with FIG. 1, we have been able to reduce the specific energy requirements for making solid beads from the same starting material to the values given in Table 2.

TABLE 2

| Energy consumption | Bead granulometry |
| --- | --- |
| 0.8 kWH/kg beads | less than 44 μm |
| 1.4 kWH/kg beads | less than 250 μm |
| 1.78 kWH/kg beads | 250 μm to 500 μm |
| 2.28 kWH/kg beads | 400 μm to 800 μm |

It will be noted that this allows fuel savings of between about 70% and about 80% depending on the size of the beads being manufactured.

Figure 2:
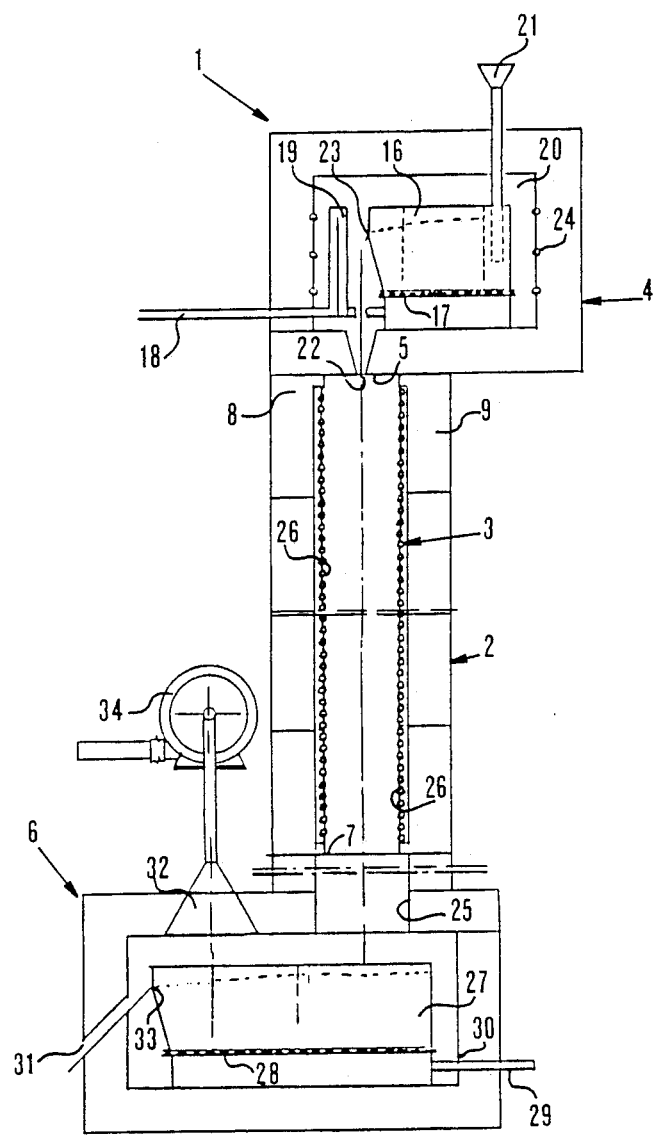

FIG. 2 shows a second embodiment of spherulizing furnace.

The feed means 4 operates on similar principles to that just described with reference to FIG. 1, and similar parts are allotted like reference numerals. It will be noted that heat exchanger 19 is located within the closed and heated compartment 20.

The heating chamber 2 differs from that of FIG. 1 in that it is of constant wall spacing. Also, the heating means 3 comprises electrical resistance heating elements 26 on the interior faces of the walls 8, 9 of the chamber. In order to reduce corrosion of these heating elements 26, it may be found economical to use nitrogen as fluidizing gas for the feed means 4, so as to maintain a non-oxidising atmosphere within the chamber 2.

In a variant, the walls 8, 9 of the chamber 2 are oppositely inclined to the vertical so as to give a downwardly widening space between them.

As in FIG. 1, the bead collection means 6 comprises a collection pipe 25. In FIG. 2, this pipe 25 terminates above a collection reservoir 27 having a porous sole 28 and a conduit 29 for feeding compressed gas through such sole to fluidize beads collected in the reservoir. The use of a fluidizing gas at ambient temperature cools the spherulized beads so that they do not agglomerate. The reservoir 27 is located in a compartment 30 which is closed except for the fluidizing gas inlet, a bead inlet 25, a bead overflow outlet 31 and an aspirator inlet 32.

The reservoir 27 has a lip 33 located so that fluidized beads can flow over that lip and fall down through the bead overflow outlet 31. An aspirator 34 is connected to aspirator inlet 32 to maintain a slight under-pressure at the base of the collection pipe 25 to overcome any heat stoppage due to thermal updraughts created in the heating chamber 2.

Figure 3:
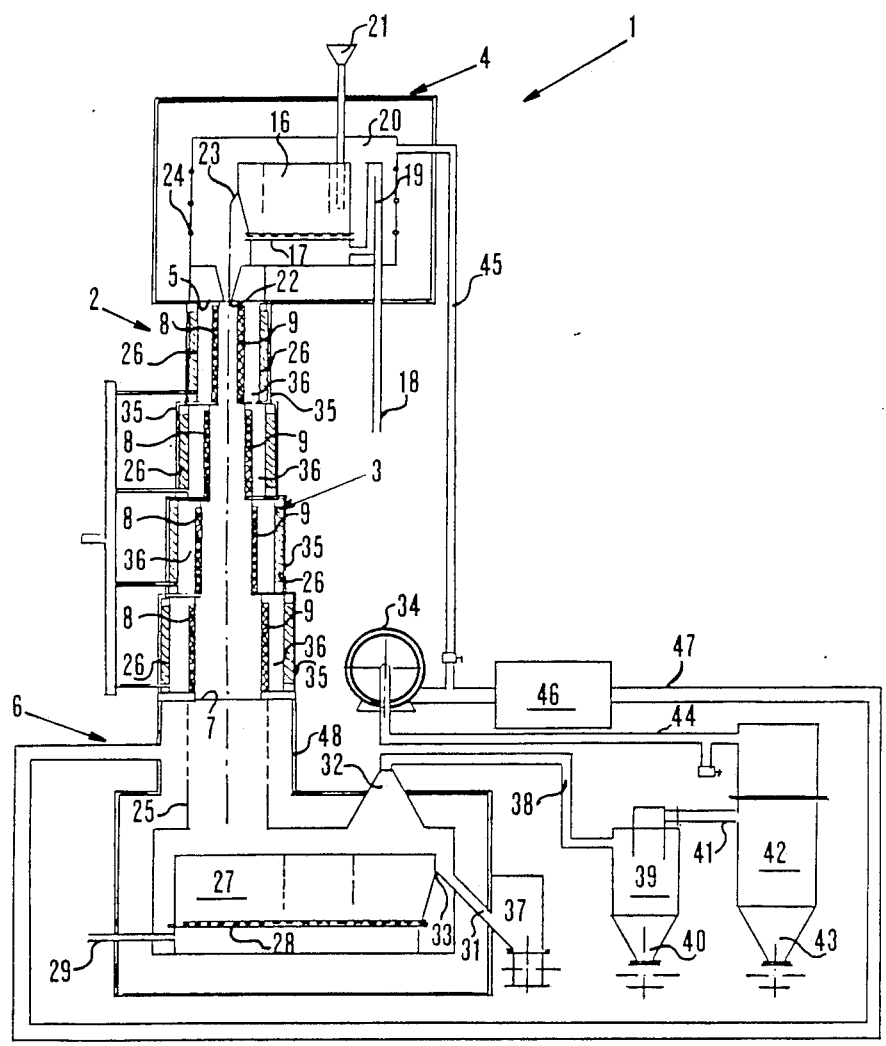

FIG. 3 shows a third embodiment of spherulizing furnace.

The feed means 4 operates on similar principles to that just described with reference to FIGS. 1 and 2, and similar parts are again allotted like reference numerals. It will be noted that heat exchanger 19 is again located within the closed and heated compartment 20.

In FIG. 3, the heating chamber 2 comprises an outer housing which carries a structure divided into four parts each of which comprises a support structure 35, electrical heating elements 26 and chamber inner walls 8, 9. The four pairs of opposed inner walls 8, 9 of the chamber 2 are each constituted by a pair of parallel vertical graphite plates, and the spacing between these plates increases down the chamber. The electrical heating elements 26 are constituted as inductive heating coils for inductively heating the graphite wall plates 8, 9, and the space between each heating coil and its associated graphite plate is occupied by a layer 36 of refractory material such as "FIBERFRAX" (TM). There are gaps between successive plates in each wall, and gas is entrained down through these gaps to form a boundary layer which reduces any tendency the particles may have to contact the walls of the chamber 2. The heating elements 26 may alternatively be electrical resistance heating elements.

The bead collection means 6 of FIG. 3 includes those elements of the bead collection means described with reference to FIG. 2. In FIG. 3, beads flowing over the overflow outlet 31 are collected in an overflow collector 37. Lighter and/or less dense beads may be sucked up through aspirator inlet 32 when they will be transported along conduit 38 to a cyclone 39 having a further collector 40 at its base. Beads which pass the cyclone are transported via a further conduit 41 to a sleeve filter 42 having a final bead collector 43 at its base. The overflow collector 37, the cyclone collector 40 and the sleeve filter collector 43 may each be fitted with a rotatable valve for drawing off bead fractions as desired. The sleeve filter is connected to the aspirator 34 by conduit 44, and the aspirated gas which has been heated by exchange with the beads may be passed via conduit 45 to the feed compartment 20, and/or it may be cooled in heat exchanger 46 and passed back to the base of the heating chamber 2 via conduit 47.

The whole is a substantially closed system and it is preferably filled with nitrogen in order to prevent or retard oxidation of the graphite plates forming the heating chamber walls 8, 9, and of the electrical heating elements 26.

Figure 4:
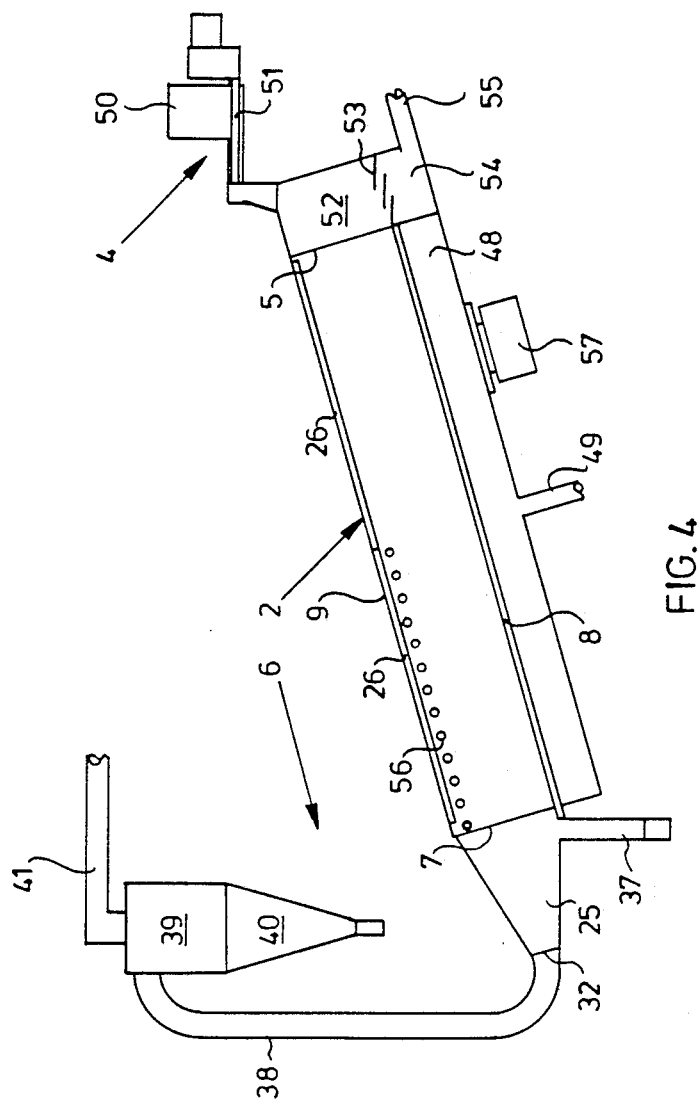
Figure 1:
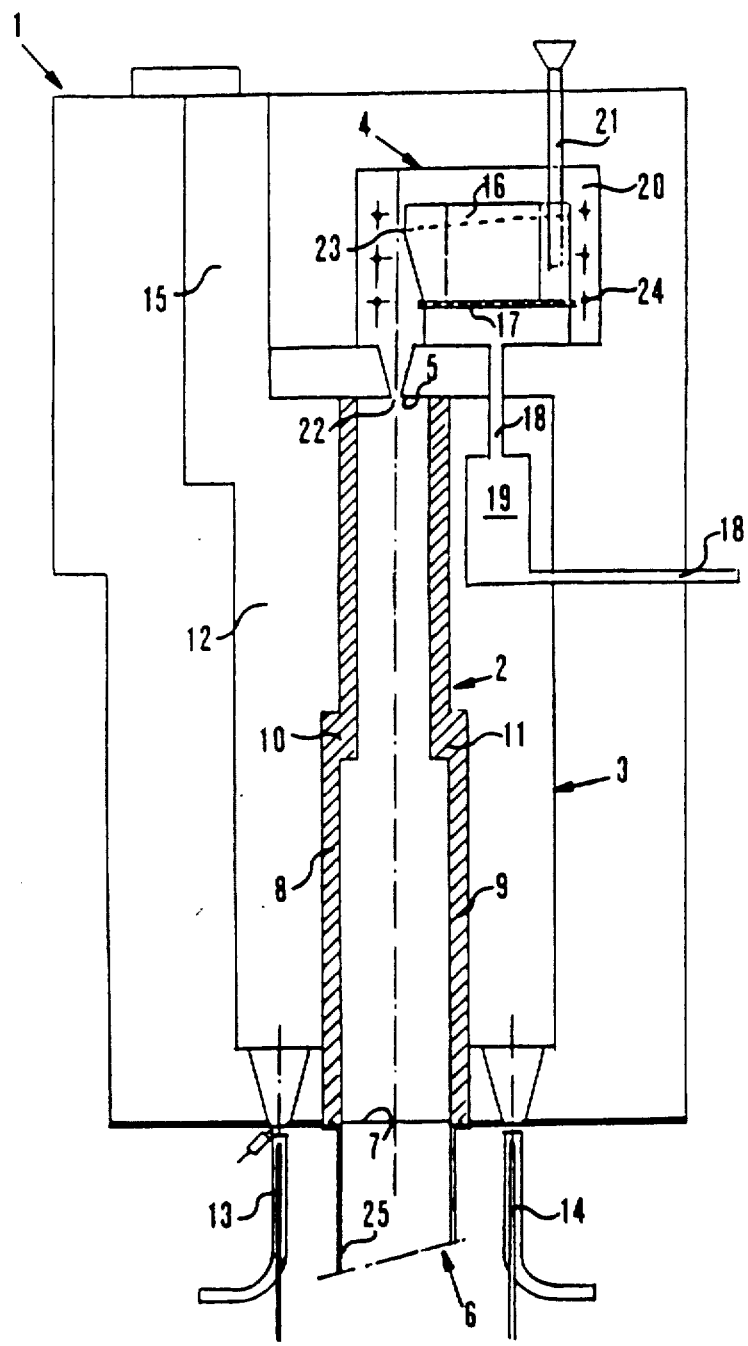

FIG. 4 is a simplified diagram of a fourth embodiment of spherulizing furnace in which the heating chamber is inclined rather than vertical. In FIG. 4, lower wall 8 of the heating chamber 2 is constituted by a porous plate, for example of stainless steel which is backed by a plenum chamber 48 having a gas inlet duct 49. Such a stainless steel plate may be coated with boron nitride to inhibit adhesion to it of the particles.

Feedstock particles are fed to the top end 5 of the heating chamber 2 from a reservoir 50 by means of a feedscrew 51 so that they fall into a top end chamber 52 whose sole is formed by a series of stepped, spaced plates 53. A second plenum chamber 54 fed from gas inlet duct 55 is located beneath those stepped, spaced plates 53. The two gas inlet ducts 49, 55 are each fed with air via a serpentine heat exchanger 56 located within the heating chamber 2. Gas flowing between the plates 53 and through the porous wall 8 of the heating chamber 2 keeps the particles in motion and assists their passage down through the heating chamber under the influence of gravity. Such particle movement is further assisted by vibrating the heating chamber 2 using vibrator 57. Upper wall 9 of the heating chamber 2 carries electrical heating elements 26 for heating the particles during such passage.

Various parts of the bead collection means 6 of this spherulizing furnace are allocated reference numerals corresponding to those of analogous parts shown in FIG. 3.

What is claimed is:

1. A spherulizing furnace for manufacturing vitreous beads, comprising:
   a chamber;
   means for heating the chamber;
   feed means for delivering a particulate feedstock to one end of the chamber; and
   means for collecting vitreous beads from another end of the chamber,
   wherein the chamber comprises a pair of opposed walls which are spaced apart by a distance less than their breadth and which are angled to the horizontal so that the chamber has an upper end and a lower end, the feed means is arranged to deliver feedstock to the upper end of the chamber so that the feedstock can pass through the chamber under gravity, and the means for heating the chamber is arranged to heat at least one wall of the pair of opposed walls so that feedstock passing between the pair of opposed walls is heated by radiant heat.

2. The furnace according to claim 1, wherein the pair of opposed walls are faced with material which reduces the tendency of hot vitreous beads to adhere to them.

3. The furnace according to claim 2, wherein the pair of opposed walls are faced with carbon or boron nitride.

4. The furnace according to claim 1, wherein means is provided for generating a gas stream which flows as a boundary layer along at least one wall of the pair of opposed walls.

5. The furnace according to claim 4, wherein at least one wall of the pair of opposed walls of the chamber is porous and means is provided for forcing gas to flow through the at least one wall which is porous to form the boundary layer.

6. The furnace according to claim 1, wherein means is provided for maintaining a non-oxidising atmosphere within the chamber.

7. The furnace according to claim 1, wherein the pair of opposed walls of the chamber are so angled to the horizontal as to define a substantially vertical path down the chamber.

8. The furnace according to claim 7, wherein the pair of opposed walls of the chamber are more widely spaced apart at the lower end of the chamber than at the upper end of the chamber.

9. The furnace according to claim 1, wherein the feed means comprises a feedstock reservoir having a porous sole and means for feeding compressed gas through the porous sole to fluidize feedstock in the feedstock reservoir.

10. The furnace according to claim 9, wherein the feedstock reservoir is arranged above the chamber for delivering feedstock by fluidized overflow.

11. The furnace according to claim 9, wherein a conduit for feeding the compressed gas passes a heat exchanger for preheating the compressed gas.

12. The furnace according to claim 1, wherein the means for heating the chamber comprises at least one electrical heater.

13. The furnace according to claim 1, wherein the means for heating the chamber is arranged differentially to heat at least two zones of the chamber.

14. The furnace according to claim 1, wherein the means for collecting vitreous beads from the chamber comprises a reservoir having a porous sole and means for feeding compressed gas through the porous sole to fluidize beads in the reservoir.

15. The furnace according to claim 1, wherein the means for collecting vitreous beads from the chamber includes means for aspirating gas away from the lower end of the chamber.

* * * * *

UNITED STATES PATENT AND TRADEMARK OFFICE
CERTIFICATE OF CORRECTION

PATENT NO. : 4,894,081

DATED : January 16, 1990

INVENTOR(S) : Neusy

It is certified that error appears in the above-identified patent and that said Letters Patent is hereby corrected as shown below:

Sheet 1 of 4 of the drawings consisting of figure 1 should be inserted as per attached sheet.

Signed and Sealed this

Fifth Day of March, 1991

*Attest:*

HARRY F. MANBECK, JR.

*Attesting Officer*      *Commissioner of Patents and Trademarks*